United States Patent [19]
Sirbu

[11] Patent Number: 6,070,796
[45] Date of Patent: Jun. 6, 2000

[54] CONDITIONAL ACCESS METHOD AND DEVICE

[76] Inventor: Cornel Sirbu, 30, rue de l'Ecosse, 78280 Guyancourt, France

[21] Appl. No.: 09/011,476

[22] PCT Filed: Aug. 8, 1996

[86] PCT No.: PCT/FR96/01269

§ 371 Date: Feb. 20, 1998

§ 102(e) Date: Feb. 20, 1998

[87] PCT Pub. No.: WO97/07448

PCT Pub. Date: Feb. 27, 1997

[30] Foreign Application Priority Data

Aug. 21, 1995 [FR] France ................................ 95 09952
Nov. 3, 1995 [FR] France ................................ 95 13038

[51] Int. Cl.[7] .............................. G06K 5/00; G06K 7/01
[52] U.S. Cl. ...................... 235/382; 235/382.5; 235/380
[58] Field of Search ................................ 235/382, 382.5, 235/380, 492, 493, 379; 902/2, 3, 5, 20

[56] References Cited

U.S. PATENT DOCUMENTS

| | | | |
|---|---|---|---|
| 3,812,461 | 5/1974 | Lemelson | 235/380 |
| 4,736,094 | 4/1988 | Yoshida | 235/379 |
| 4,900,903 | 2/1990 | Wright et al. | 235/380 |
| 4,993,068 | 2/1991 | Piosenka et al. | 235/380 |
| 5,093,862 | 3/1992 | Scwartz | 235/382 |
| 5,175,416 | 12/1992 | Mansvelt et al. | 235/379 |
| 5,386,104 | 1/1995 | Sime | 235/379 |
| 5,473,144 | 12/1995 | Mathurin | 235/380 |
| 5,546,523 | 8/1996 | Gatto | 235/379 |
| 5,648,648 | 7/1997 | Chou et al. | 235/382 |

*Primary Examiner*—Donald Hajec
*Assistant Examiner*—Daniel St. Cyr
*Attorney, Agent, or Firm*—Oblon, Spivak, McClelland, Maier & Neustadt, P.C.

[57] ABSTRACT

A conditional access device for use in connection with a host electronic equipment. The device includes a pointer peripheral containing one or more integrated circuit card coupler units. In addition, it also includes a device for acquiring personal information about a user. The personal information is locally compared with information stored in the integrated circuit card without passing through the host equipment.

25 Claims, 12 Drawing Sheets

| FID | OPC | DLEN | CLG / RPL | CRC |
|---|---|---|---|---|

FIG. 13

| OPC | | |
|---|---|---|
| OPC.C | OPC.A | OPC.S |

FIG. 14

| Sequence | 7 MSB | 6 | 5 | 4 | 3 | 2 | 1 | 0 LSB |
|---|---|---|---|---|---|---|---|---|
| Byte 1 | X | 1 | L | R | X7 | X6 | Y7 | Y6 |
| Byte 2 | X | 0 | X5 | X4 | X3 | X2 | X1 | X0 |
| Byte 3 | X | 0 | Y5 | Y4 | Y3 | Y2 | Y1 | Y0 |

FIG. 15

| Séquence | 7 MSB | 6 | 5 | 4 | 3 | 2 | 1 | 0 LSB |
|---|---|---|---|---|---|---|---|---|
| Byte 1 | 1 | 1 | L | R | X7 | X6 | Y7 | Y6 |
| Byte 2 | X | 0 | X5 | X4 | X3 | X2 | X1 | X0 |
| Byte 3 | X | 0 | Y5 | Y4 | Y3 | Y2 | Y1 | Y0 |
| Byte 4 | OPC | | | | | | | |
| Byte 5 | DLEN = m | | | | | | | |
| Byte 6 | $RPL_{m-1}$ | | | | | | | |
| ... | ... | | | | | | | |
| Byte m+6 | $RPL_0$ | | | | | | | |
| Byte m+7 | $CRC_{n-1}$ | | | | | | | |
| ... | ... | | | | | | | |
| Byte m+n+6 | $CRC_0$ | | | | | | | |

| Séquence | 7 MSB | 6 | 5 | 4 | 3 | 2 | 1 | 0 LSB |
|---|---|---|---|---|---|---|---|---|
| Byte 1 | 1 | 1 | L | R | X7 | X6 | Y7 | Y6 |
| Byte 2 | X | 0 | X5 | X4 | X3 | X2 | X1 | X0 |
| Byte 3 | X | 0 | Y5 | Y4 | Y3 | Y2 | Y1 | Y0 |
| Byte 4 | OPC ||||||||
| Byte 5 | DLEN = 32 ||||||||
| Byte 6 | $RPL_{31}$ ||||||||
| Byte 7 | $RPL_{30}$ ||||||||
| Byte 8 | $RPL_{29}$ ||||||||
| Byte 9 | $RPL_{28}$ ||||||||
| Byte 10 | $RPL_{27}$ ||||||||
| Byte 11 | $RPL_{26}$ ||||||||

| Byte 1 | 1 | 1 | L | R | X7 | X6 | Y7 | Y6 |
|---|---|---|---|---|---|---|---|---|
| Byte 2 | X | 0 | X5 | X4 | X3 | X2 | X1 | X0 |
| Byte 3 | X | 0 | Y5 | Y4 | Y3 | Y2 | Y1 | Y0 |
| Byte 4 | $RPL_{01}$ ||||||||
| Byte 5 | $RPL_{00}$ ||||||||
| Byte 6 | CRC01 ||||||||
| Byte 7 | CRC00 ||||||||

FIG. 18

CONDITIONAL ACCESS METHOD AND DEVICE

BACKGROUND OF THE INVENTION

1. Field of the Invention

This invention relates to the field of conditional access devices created by a pointing device integrating one or several couplers for microcircuit cards.

The device is designed to carry out transactions secured by microcircuit cards, to identify the cardholder and/or to check different stages of transactions.

The applications mainly concern conditional access to the resources of host equipment, conditional access to available resources on external equipment with which the host equipment is linked or connected, and the management of software operating licenses stored in the host equipment or in the external equipment with which the host equipment is linked or connected.

The meaning of 'microcircuit card' is a support, generally a card, comprising one or several integrated circuits executing processing functions and/or smart cards or microprocessor cards, commonly known as 'chip cards'. Contactless cards or PCMCIA cards are examples of these microcircuit cards.

The meaning of "microcircuit card coupler" is any means of operating a signal exchange interface between hardware and a microcircuit card, according to standardized or specific communication protocols. Signal exchange can be carried out by an electrical connection or a wireless link such as an electromagnetic or light link.

By "host equipment" we mean a computer terminal, a workstation, a personal computer, a multimedia terminal, and particularly but by no means exclusively, all the above-mentioned equipment comprising means of bidirectional connection, all be it temporary or permanent, to a local or public communications network.

The term "pointing device" means any manually operated device with which the user acts upon visual objects. It is intended to be used with interactive host equipment having a screen and a user's graphical interface for visual objects. Examples include an optomechanical mouse pointer, an optical mouse needing a special mat, a ball or track ball, a digitizing stylus or a cursor, a touch pointer, a stick or joystick, or a remote control lever system for CD-I.

2. Discussion of the Background

The peripheral devices work conjointly with the equipment they command and with which they are connected by the intermediary of a RS232, USB communication port or an equivalent system, or in other cases they are linked by wireless transmission, for example by infrared or microwave links. In certain instances, especially when the host equipment is a portable computer, these devices are integrated into the equipment, even though the device represents a self-contained unit.

Generally, they are easily interchangeable devices because most host equipment manufacturers have adopted common standards. They are also relatively cheap in relation to the host equipment and can be replaced by a similar device independently of the host equipment without difficulty.

It has been suggested in the state of the art to integrate a microcircuit card connector into certain peripheral pointing devices. Such was the case in European Patent No. 485,275 and German Patent No. 4,326,735. The peripheral device described in the European Patent represents the closest state of the art device. It comprises a microcircuit card connector directly linked to the common leads between the computer and the peripheral devices, allowing both signal exchange relative to the pointing functions and signal exchange for the operation of safety functions associated with the microcircuit card. The peripheral devices act in a transparent way between the microcircuit card and the computer with which it is connected. No processing occurs in the peripheral device, which only ensures the electrical link between the microcircuit card and the computer. Thus, the whole personal identification code keyin process is done in the host equipment; such processing is inconvenient and constitutes a major disadvantage to the commercial development of public networks such as the INTERNET.

Indeed, today's host equipment is almost always linked to at least one network, either inside an organization or to a public network like the INTERNET. It is therefore possible, and even easy, for a third party to connect himself to the host equipment and examine the data processed by it. There are technical solutions to filter accessible data from third parties, but these solutions are in contradiction to most user's spirit of openness and their wish to raise the level of communication. They also require complex arbitration to gain optimal performance which is generally beyond the scope of the average user.

SUMMARY OF THE INVENTION

The object of the invention is to counter these drawbacks by proposing a conditional access device which considerably increases the safety level against abusive intrusions coming from third parties seeking to procure the code or access key associated with the microcircuit card through links between the host equipment and a public or internal network. An intrusion into the computer's memory would never be allowed access to the user's certification data.

For this purpose, the invention resides in the fact that the microcircuit card is operated locally, meaning in the peripheral pointing device, and not in the host equipment. This feature is essential. It ensures a separation between the user's identification, on one hand, and on the other hand, the computer and the communications network with which it is or could be connected.

The means of user identification are found in the peripheral pointing device to which only the user has access. It captures the personal data which is usually secret, for example his confidential code. This data is checked by a local microcalculator using the data recorded on the card. The microcalculator is generally integrated into the microcircuit card, but may also be integrated into the peripheral device. This verification does not involve any transmission of secret data to the computer from either the device or the inventive process. The comparison is expressed by approval or nonapproval of data from the user, which is the only data transmitted to the computer. This comparison is essential to avoid the accessibility to confidential data, such as a code, by a third party linked to the computer by the intermediary of a local or a telephone network.

The invention is advantageously enhanced by the different features as follows:

- it comprises a sensor for the capture of a biometrical identification signal, such as a fingerprint image sensor and/or an eye image sensor and/or a vocal recognition sensor;
- it comprises vocal control means for transactions;
- the keyboard and/or the screen is/are secured on the upper mouse surface in such a way that a cover is joined onto the mouse casing so, in a closed position, it protects the keyboard and/or screen when the chip card coupler is not in use;

a chip card insertion slot is provided at the level of a groove on the mouse periphery, in the space between the function keys and the main part of the casing of the mouse on which the keys are installed;

in the case in which the peripheral device has a fingerprint image sensor, the device casing has a guide in which the operator's finger may be placed, his thumb, for example;

the device comprises a clock under permanent power supply which ensures the dating of operations, especially financial operations;

the device has at least two chip card inputs;

it has management and execution means for at least one security application associated with the host equipment applicative software;

it comprises the means for allowing security operation transfer between storage facilities, management and execution of a security application and a microcircuit card comprising a distribution application of these security applications;

it comes with a clip board, a stylus, a double chip card coupler and means to capture, compress, and record written data and later unload it onto the host equipment;

it comprises a personal multimedia aid and/or incorporates facilities to operate one or several desktop applications, such as a calculator, diary, or a clock;

the device comprises a permanent clock and means for transmission to the peripheral equipment of dated numerical data having a data sequence relative to the authorization calculated for the microcircuit card's stored data and the data keyed in by the user in addition to a data sequence given by the clock.

The invention also concerns a security application management and execution process in the host equipment consisting of a comparison, in the peripheral device linked to the host equipment, of personal data and data recorded in the microcircuit card without the personal data being transmitted to the host equipment. The peripheral device integrates personal data acquisition means and has at least one microcircuit card connector.

In accordance with a favorable implementation mode, the process includes an extended communication protocol coming from the communication protocol specific to the pointing means of the peripheral device. This protocol enables the use of only one serial port between the applicative software and the pointing and security facilities amalgamated in the device according to the invention.

Thus, in accordance with this favorable protocol form, the data and the commands are transmitted in the form of frames comprising a whole made up of fields each of which contain a coded sequence comprising a predetermined number of bits, each frame includes an identification field and at least one of the following fields:

a pointing information field, and an information field relative to secured means.

The information field relative to secured facilities must contain a control field which specifies the type of information followed by the optional fields giving the length of the security application message and a control field for the message's integrity.

Advantageously, the process supplies pointing information to applicative software and at the same time ensures message transmission towards the same or another simultaneously active applicative software and its security application.

In preference, the device transmits messages emitted by secured means in frame form whose first field is the specific pointing frame modified according to the complete message or the message divided into several frames of the same type. Thus, the pointing frames and the extended frames can be alternated.

According to one embodiment, the secured storage and execution means of the security applications are amalgamated into a releasable miniature microcircuit. Therefore, the management and the availability of the security applications storage and execution means are made independent in relation to the device's maintenance.

BRIEF DESCRIPTION OF THE DRAWINGS

The invention will be better understood by reading the following detailed summary, giving a nonrestrictive example illustrated by the figures.

FIGS. 13 to 18 illustrate the structure of communication frames used with the conditional access device according to a possible implementation mode according to the invention.

DESCRIPTION OF THE PRFERRED EMBODIMENTS

Figure 1:
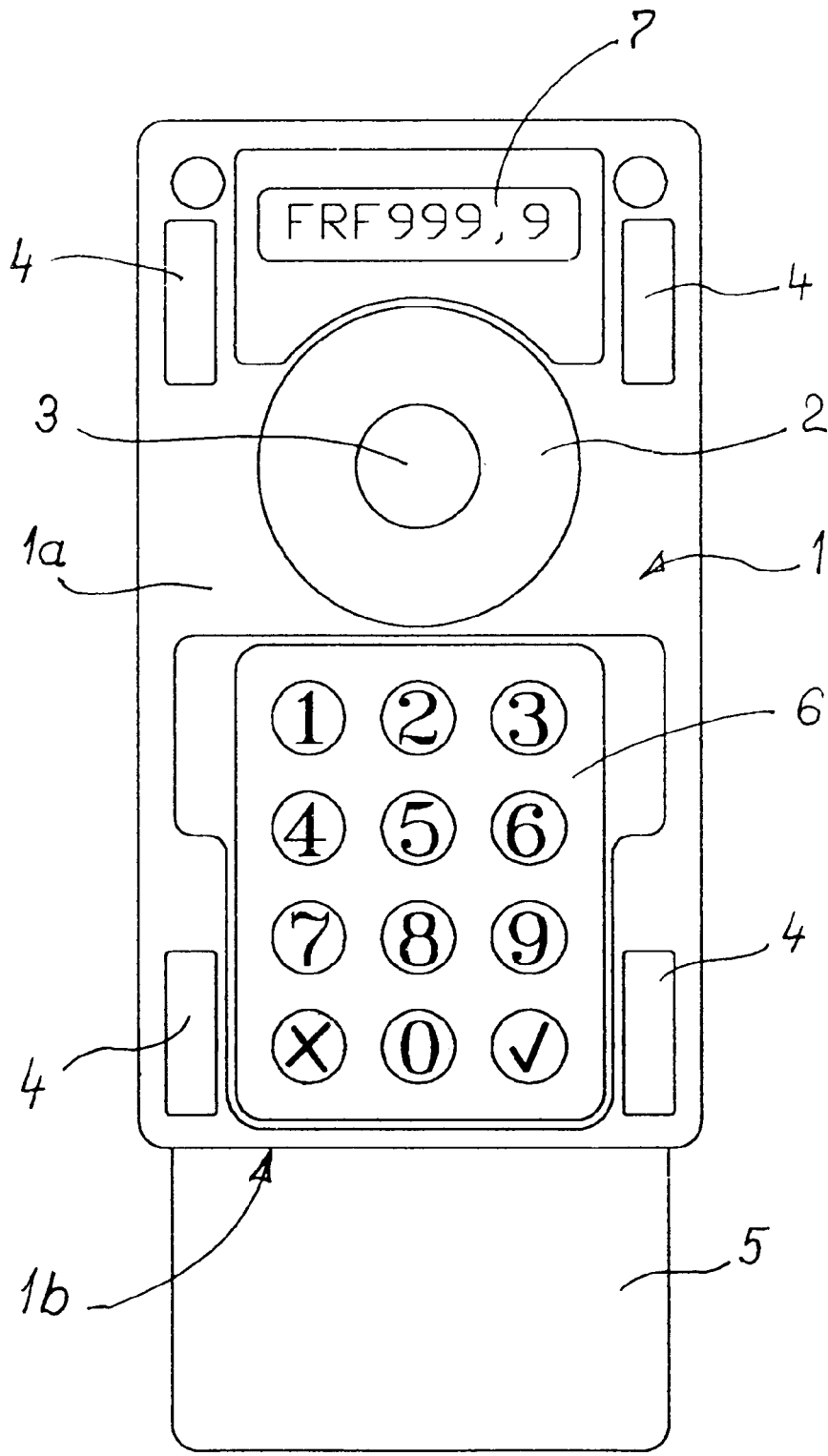
FIG. 1 represents a bottom view, (on the ball side) of the conditional access device according to a possible implementation of the invention in its mouse version.

The device according to the invention will be described in the ball mouse model. The same approach applies to the other pointing devices. FIG. 1 shows a device according to the invention derived from an optomechanical mouse (1) whose ball (3) is maintained in its casing (1*a*) by a cover (2). A keyboard (6) is placed in a specified opening on the bottom of the main part of the mouse casing. The depth of this opening is chosen in relation to the thickness of the keyboard (6) as well as the thickness of sliding spots (4). Thus, the whole device does not touch the supporting surface leading the ball (3).

The device represented in FIG. 1 comprises a microcircuit card coupler. In FIG. 1, a microcircuit card (5), for example in accordance with the ISO 7816 norm or even a contactless card, is inserted into the device via a lateral slot (1b). The device may comprise the means for inserting two types of microcircuit cards to identify the type of card and verify its correct insertion.

Thus, the keyboard (6) may be placed on the upper mouse cover, protected or not by a jointed mask. The device may carry a liquid crystal display (7) to control transactions and operations and it is connected to the host equipment by a link cord with a plug on the ad hoc port of the host equipment. The power supply may be implemented by a self-contained method or by the host equipment. The electrical power supply may be set up using either an independent peripheral-based power supply or, as in most cases, by the voltage available from a port (RS232, USB, GEOPORT) which is linked to the peripheral device or to a second port (keyboard, etc.).

The device may also incorporate a permanently power-supplied clock which is necessary for the dating of financial transactions. It may also comprise secured means authorized to set up an electronic wallet application. Thus, it can receive and keep money or an electronic value. The means may be implemented either with a secured version of a microcontroller incorporating an electronic wallet application or using a second microcircuit card coupler having an electronic wallet application. This second electronic wallet card is in preference a miniature contact card and is placed inside the device (for example GSM format 15×25 mm). This arrangement facilitates its replacement in the case of validity expiration or failure. This built-in financial function corresponds to an electronic wallet.

Figure 2A:
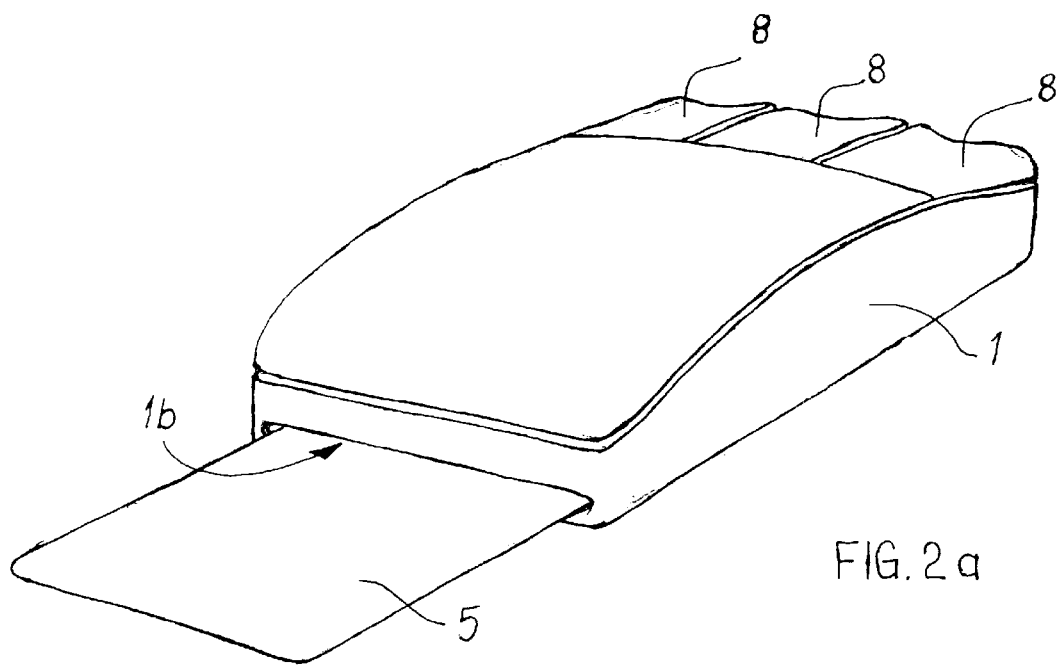
FIGS. 2a and 2b, in perspective view, represent two embodiments of possible implementations for the mouse.
Figure 2B:
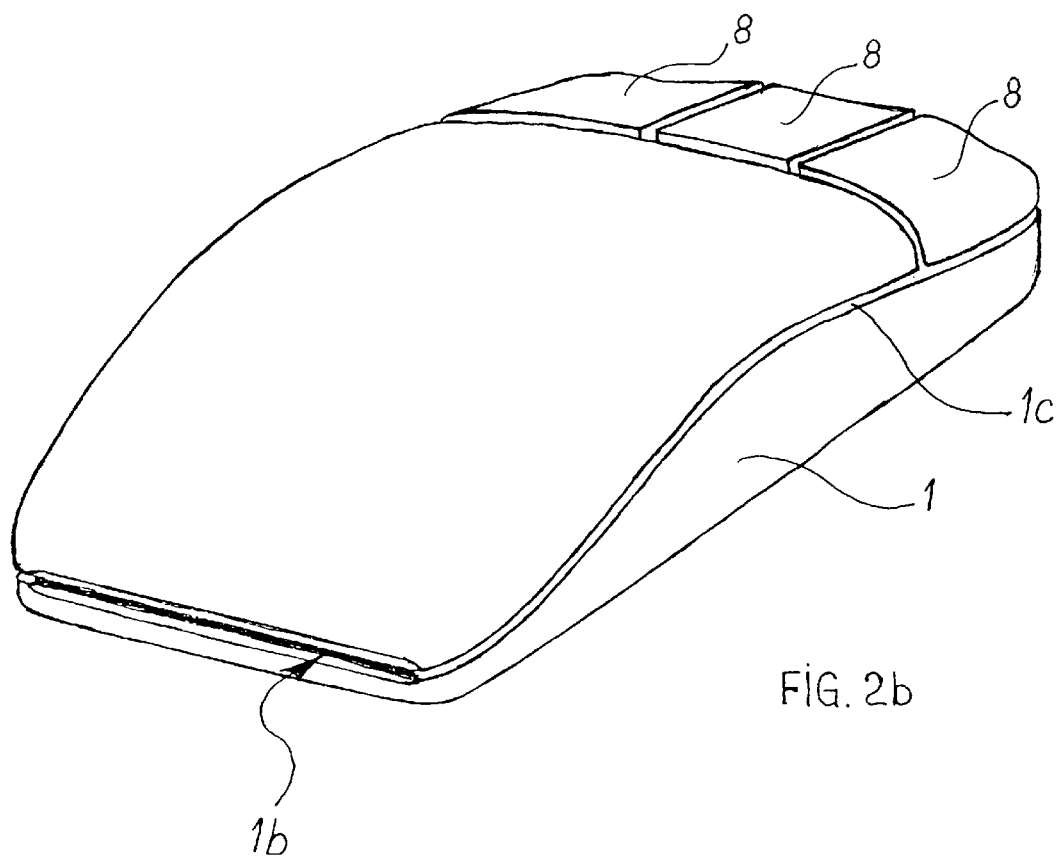
Figure 2C:
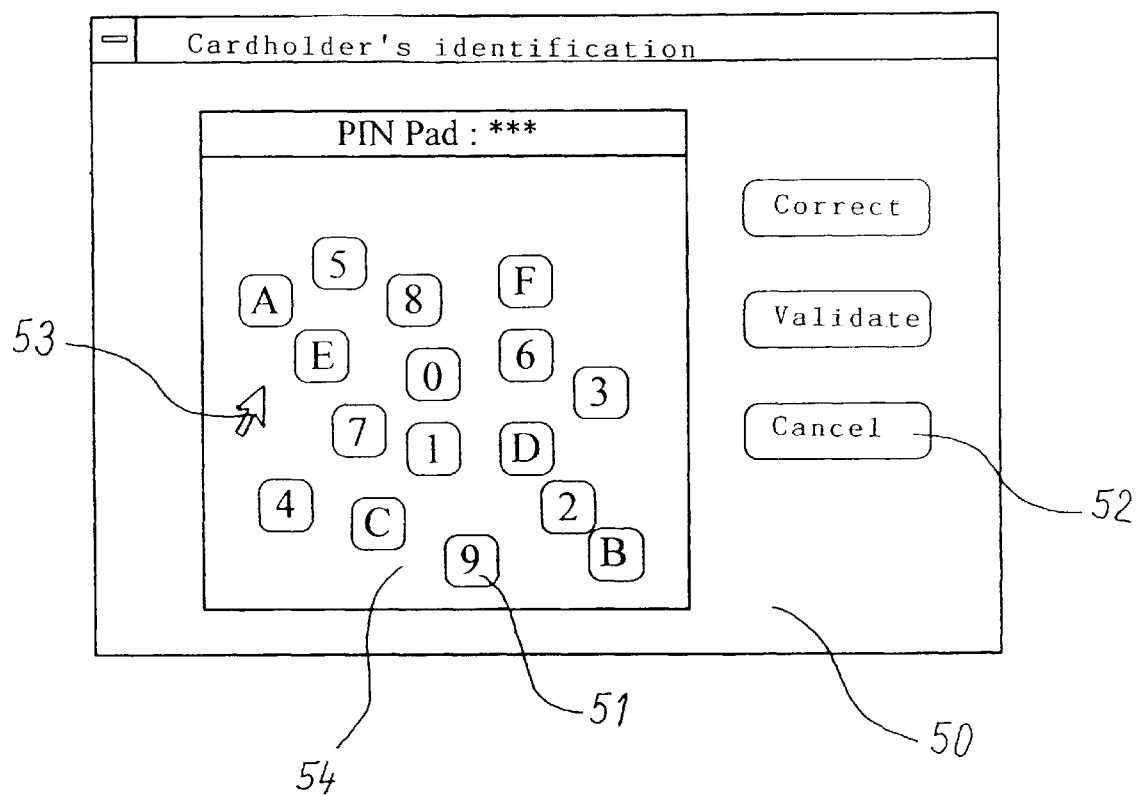
FIG. 2c represents the view of a screen to operate an embodiment of the implementation.

An embodiment represented in FIG. 2c consists in replacing the personal data keyboard by an equivalent computing solution. This equivalent solution is constituted by a program giving a host equipment screen (50) display of a graphical representation of a virtual keyboard (54) made up of virtual keys (51, 52). The virtual keys (51) on this keyboard are positioned in a random way, different in each new activation of this program. The personal data key-in operation is carried out with the aid of the conditional access device's pointing functions according to the invention. Signal processing operation and index position validation (53) on the virtual keyboard are done exclusively on the peripheral device so as to prevent the data transmission of the validated position to the host equipment.

Several ergonomic configurations are possible on the mouse (1).

As illustrated in FIGS. 2a and 2b, two different configurations are envisaged.

In the two cases, the lateral slot (1b) is placed on the side of the mouse (1) at the opposite end to function keys 8. The configuration illustrated in FIG. 2b presents an advantage because it simplifies the manufacturing tools. The slot (1b) is situated in a groove (1c) usually found on the periphery in the extension of the space between the function keys (8) and the main part of the mouse (1).

Figure 3:
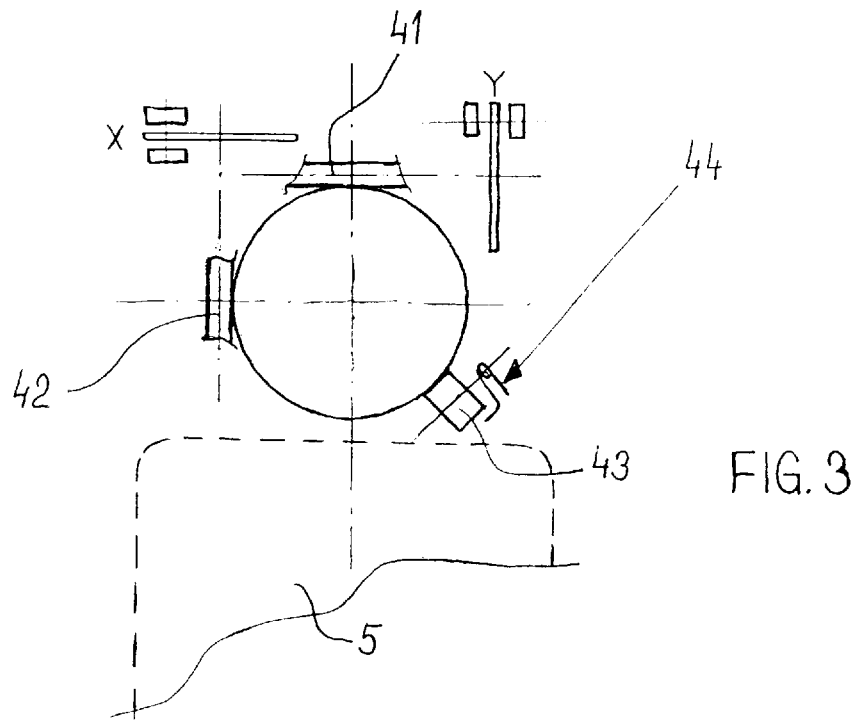
FIG. 3 is a schematic representation illustrating an advantageous configuration inside the mouse casing of FIG. 1.

FIG. 3 illustrates an advantageous configuration inside the casing (1). Traditionally in a ball mouse's casing, there are two encoder axes (41, 42) and a thrust roller (43) in permanent contact with the ball. These encoder axes (41, 42) track the ball's movement. The thrust roller (43) has a holding spring (not shown) in contact with the ball. This spring is a spiral spring which reduces the space required for the pressure mechanism inside and so liberates a volume of space for the chip card's insertion zone.

Figure 4:
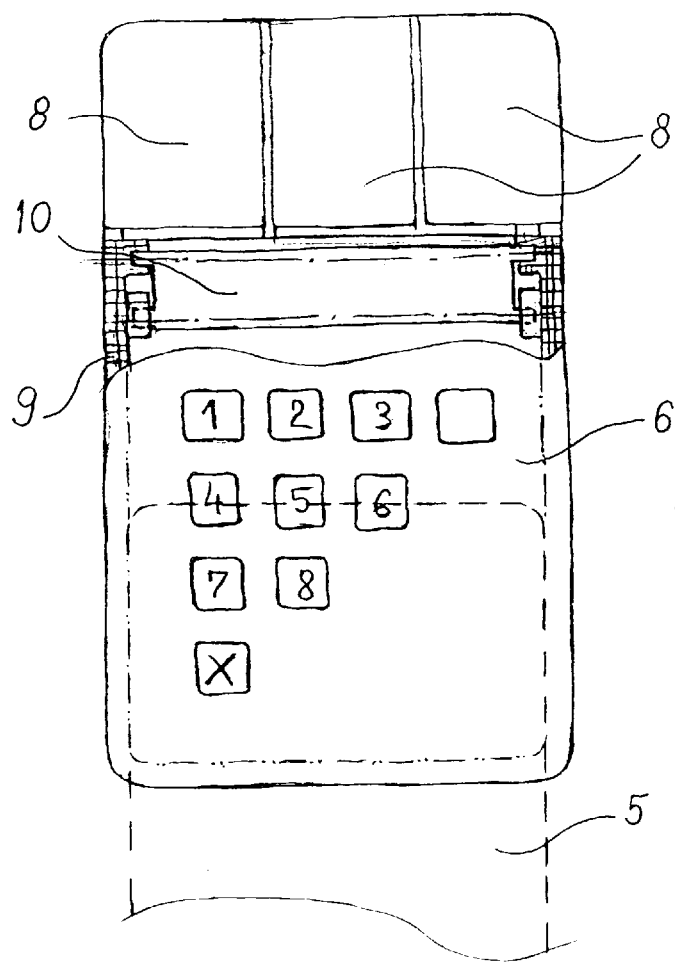
FIG. 4 is a top view of the ball mouse model of the conditional access device according to another possible embodiment of the implementation.
Figure 5:
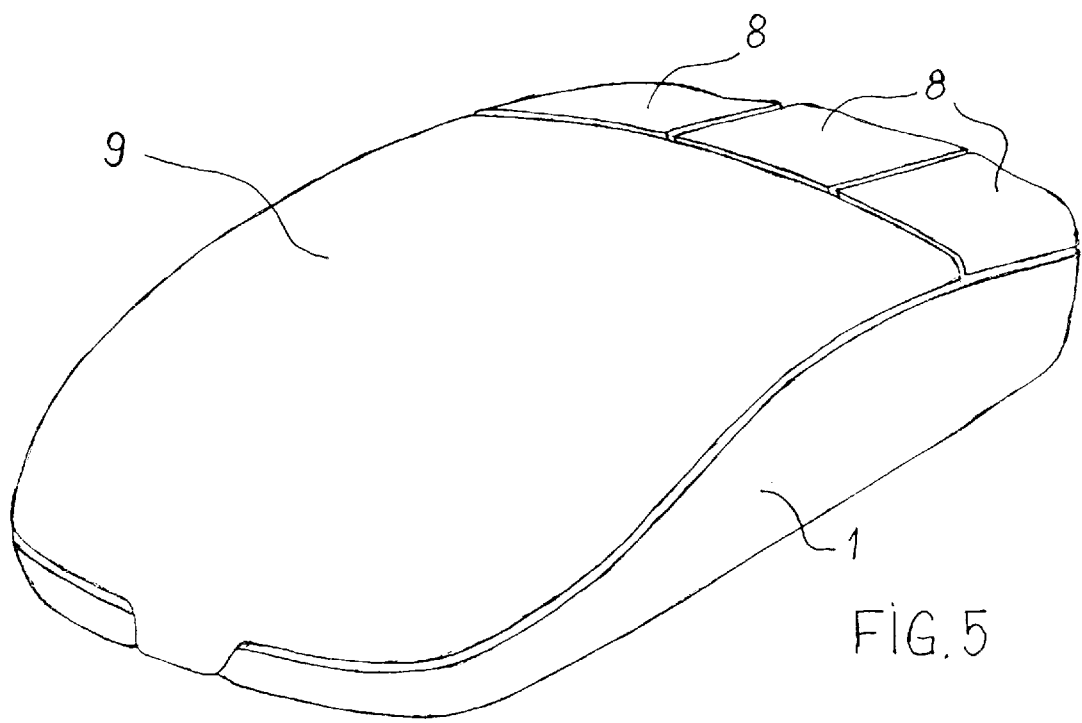
FIG. 5 is a perspective view illustrating a possible implementation mode of FIG. 4.
Figure 6:
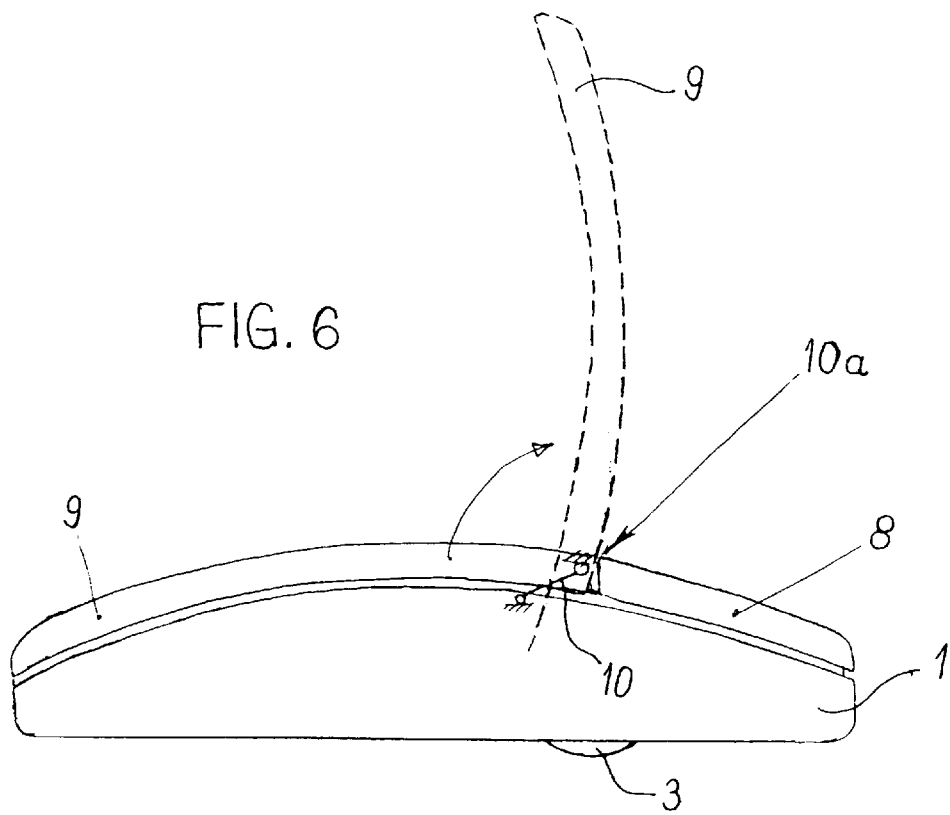
FIG. 6 is a schematic representation in a side view, illustrating a possible implementation mode of FIG. 4.

In another embodiment of the ball mouse according to the invention illustrated by FIGS. 4 to 6, the keyboard (6) is placed on the mouse's top surface, meaning on the surface opposite to the bottom. A jointed cover (9) protects the keyboard (6) when the chip card's coupler function is not used. The cover (9) is shaped in a way that its top surface is extended exactly in the same shape as the casing in its closed position. Thus, the peripheral device is like a traditional mouse.

This cover (9) is hinged to the casing by an arm (10) which pivots on the casing. The arm (10) itself pivots in relation to the casing around an axis which is parallel to the pivoting axis of the cover (9) attached to the arm (10).

A stop (10a) seen in FIG. 6 is provided on the casing of the mouse (1) to limit the clearance of the cover (9). Therefore, there is a joint which enables the operator to clear the cover (9) completely from the keyboard so as to liberate its access. Thus, the peripheral device still maintains its compact aspect.

In the case of a financial transaction application for an on-line network or a local network, the operator can key in the following different operations as follows:

Validation,

Correction, erase last keyed-in number,

Journal, reading of the list of the last transactions,

Balance of the account, reading of the remaining sum or balance value in the electronic wallet card, Select, currency selection for an intersector electronic wallet, Cancel, abort current transaction, Local, stop communication with host equipment, Lock, chip card, EW/Card, electronic wallet selection (EW) or inserted card if applicable, and Transfer, initiate transfer operation.

The device attached to the host equipment comprises suitable software means and if connected to an information network enables secured payments on-line for goods and services by credit cards and electronic wallet cards but also enables secured money transfer between two distant financial bodies.

For example, two people situated in different places, each having a personal computer with a modem according to the invention may execute the following secured transactions:

transfer an amount of money from the first person's credit card to the electronic wallet card of the other person;

select the currency which is the object of the transfer; and transfer money from one electronic wallet card to another.

Thus, both persons may use on-line financial services for electronic wallets offered by their banks to execute the following secured transactions:

transfer money from a current account to an electronic wallet card and vice versa; and change money into a different currency and vice versa.

After each time the cardholder's identity is demanded, his personal code and his identifying signature are keyed-in; then the device creates a protective shield against computer fraud.

Furthermore, the device comprising electronic wallet means allows the following operations:

checking the remaining value or balance;

reading the transaction journal; and locking its electronic wallet.

A chip card may comprise several financial applications, for example a credit card and at least one electronic wallet. Each basic device according to the invention has means for carrying transactions between the resident financial applications on the same chip card, because the security conditions are implicitly ensured by the card itself.

The device incorporating, either an internal electronic wallet (EW) or two identical couplers, one of which comprises an electronic wallet card having an intermediary role, may be used in the local working mode in card to card transactions, the cards being successively inserted in the available connector to:

debit a credit card and load an electronic wallet;

transfer money from one electronic wallet to another;

keep the money in the electronic wallet; or cancel the last transaction.

It should be noted that the means setting in operation the cardholder's identification, (personal code keyin or signature), plus the chip card coupler means and the pointing means (selection, validation, modification), define the basic configuration for each type of device described. In combining different means of serial communication with host equipment, keyboards, displays, power supply, electronic wallets, different device families are obtained according to the invention.

A peripheral device of the type just described adds chip card terminal functions used in financial access control, identification, and toll applications to a personal computer or an interactive television.

It allows payment for goods and services on networks with credit cards or electronic wallets as well as home banking functions. In the electronic wallet (EW) version, the device may be used as a monetary reserve for payment via on-line networks or local networks.

The device enables the use of personal payment means (credit cards, electronic wallet), or anonymous means (electronic wallet). In this way, the device handles electronic money as a direct replacement to physical money and brings down the physical barriers between operators.

The device may also be used for business network administration, securing access and protecting software.

The device replaces the traditional mouse or any other serial pointing device and it comes with a software pilot suited to each type of host equipment. Generally, it is a remote control unit designed for multimedia terminals and is recognized as a pointing device (personal computers, interactive multimedia televisions). It can also incorporate additional applications such as a financial calculator, clip board, diary, etc.

Designed in the form of a clip board with a stylus and a double chip card interface which may be an option, written files may be compressed into the memory and the device can be used by medical professions.

Figure 7:
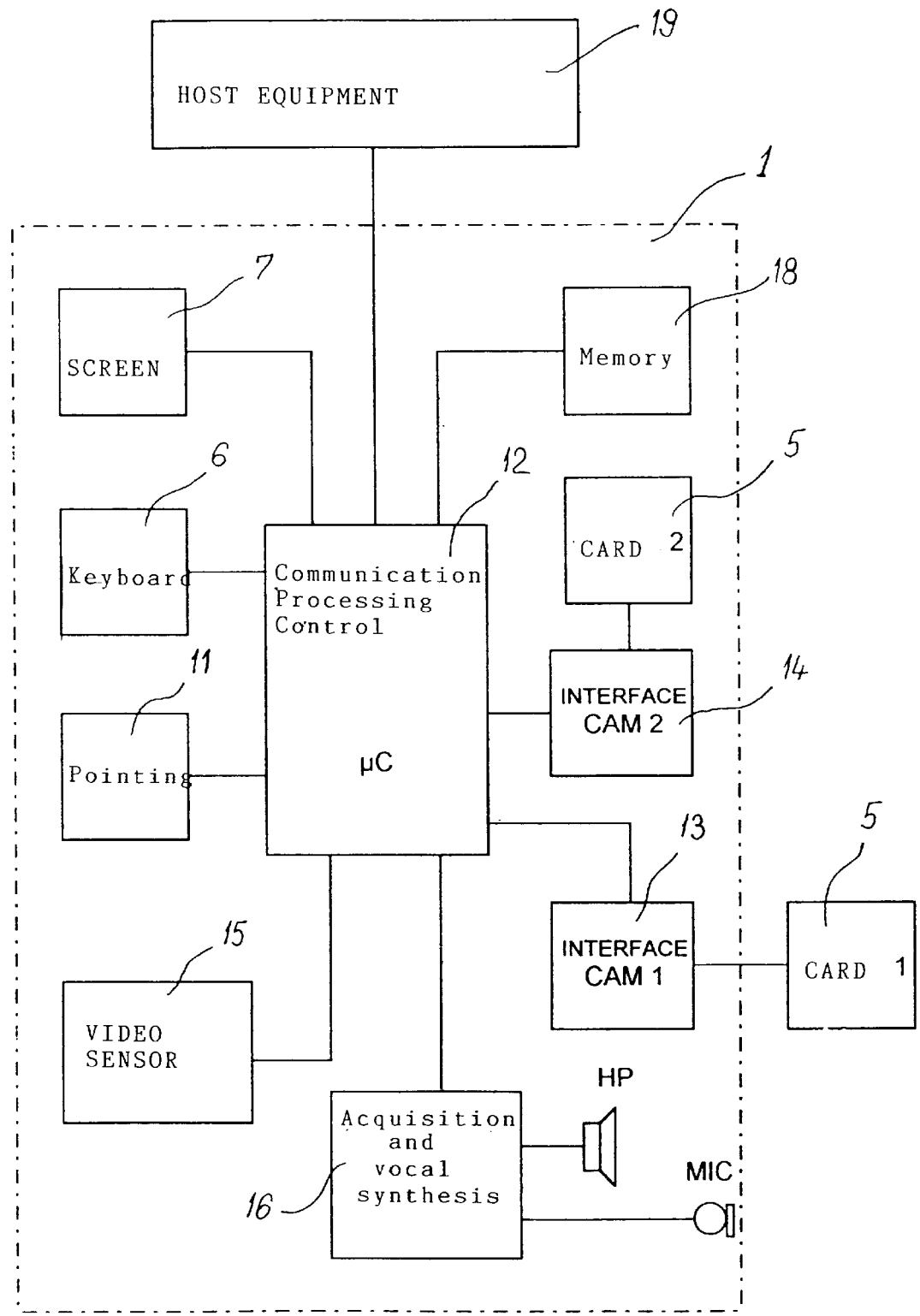
FIG. 7 is a block diagram illustrating the conditional access device with biometrical control.

FIG. 7 represents a configuration setting in operation a biometrical control using, for example, a fingerprint scanner or an eye image scanner comprising an image sensor (15) which is, for instance, connected to a peripheral microcontroller (13). The microcontroller (13) is also linked to specific pointing means (11), the liquid crystal display screen (7) as well as the keyboard (6). Thus, it communicates with the external chip card (5) through an interface (14) by a microcomputer (19) with which the peripheral device is associated.

In another embodiment, a microcontroller (12) is conveniently linked to a synthesis and vocal recognition processor (16) which is, for example, linked to a microphone MIC and a loudspeaker HP placed in the casing (1). An operating embodiment consists in verifying the user's vocal signature during the reading of the data displayed on the peripheral screen or on the host equipment. This implementation mode enables vocal recognition and a comparison with the digital vocal signature recorded on the microcircuit card (5), coming from an extremely reduced number of words and using algorithms and simplified integrated circuits. It is a low cost method which only slightly reduces the safety of the comparison.

The microcontroller (12) has the shape of the biometrical object read by the sensor (15) and/or the vocal recognition unit (16) enabling processing by a card (5). This microcontroller (12) receives and compares the biometrical object with the reference presented in the memory. In this embodiment, the comparison between the reference and the biometrical object read by the sensor (15) or the unit (16) can be implemented by the microcontroller (12).

It should be noted that the microcontroller may be an optimized mathematical coprocessor for signal processing and/or cryptographical calculations. Thus, all or part of the unit (16) can be conveniently integrated into the same chip or module.

The biometrical object, such as an image read by the sensor (15) or the vocal recognition unit (16), replaces the user's identification code which does not need to be keyed-in on the keyboard (6).

Figure 8:
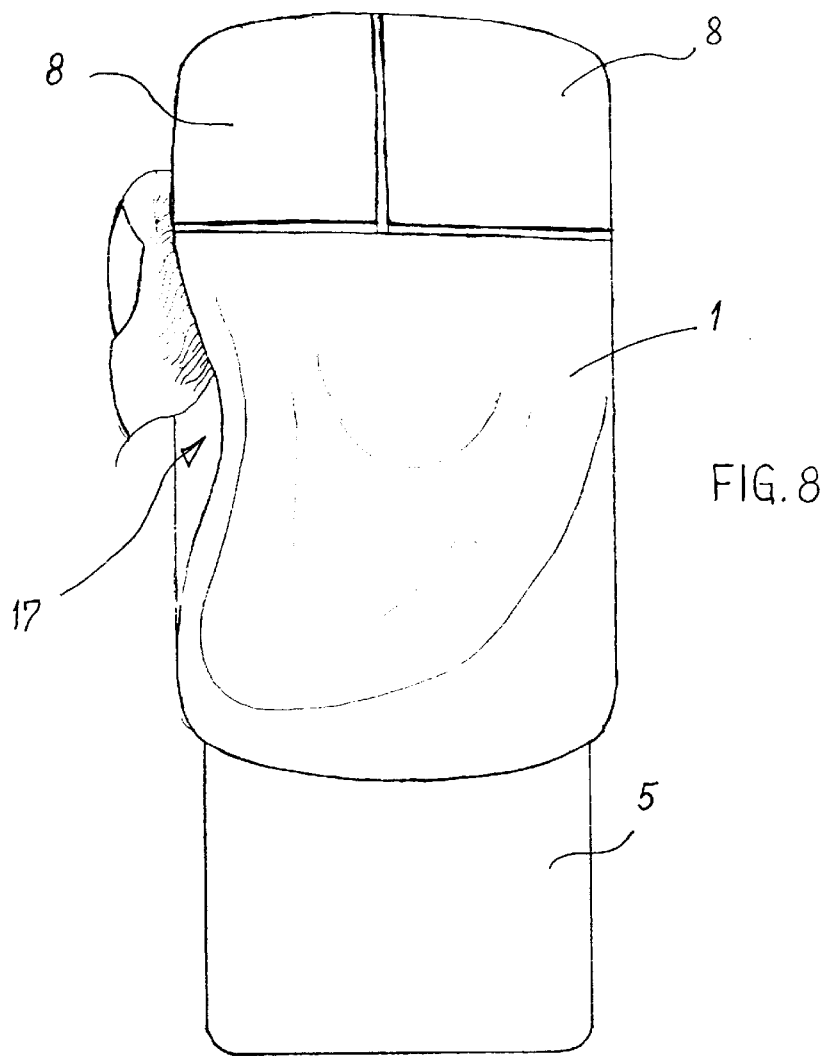
FIG. 8 is a top view of the conditional access device with biometrical control.

FIG. 8 represents a configuration with the sensor situated on the lateral edge of the mouse (1). The edge takes the form of a guide (17) intended to receive the user's finger, his thumb for example. The EN1546 European norm project presents the working and the use of electronic wallet cards in detail. Also, the EMV European norm describes in a detailed way the standard procedures for payment by microcircuit cards (5) as well as the features of such cards.

The peripheral device may comprise a wireless communications medium to increase mobility in relation to the host equipment. Radio or infrared solutions can be used to counter environmental constraints and those of target host systems.

Figure 9:
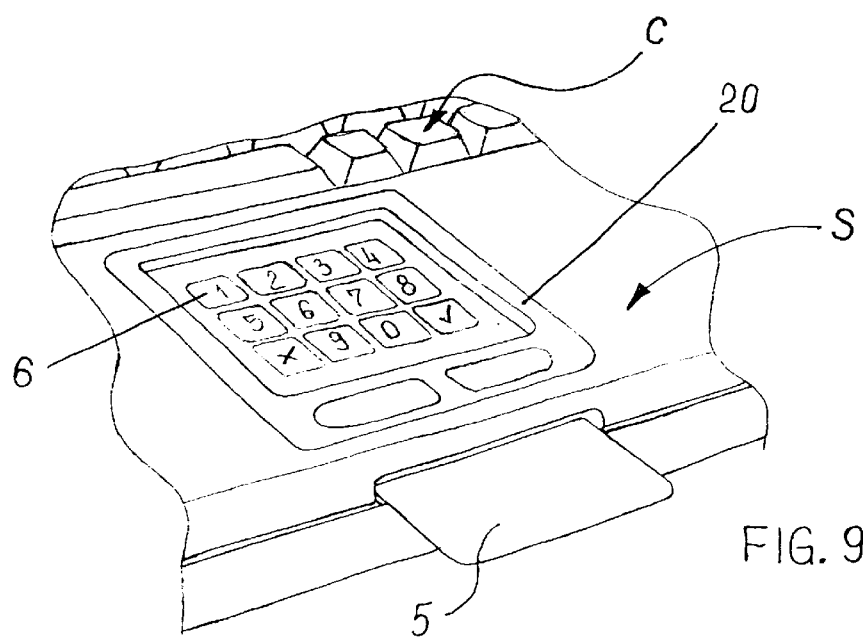
FIG. 9 is a schematic representation, in perspective, without the microcomputer keyboard but with a touch pointing device according to the invention.

The peripheral device can be integrated into the microcomputer itself. An embodiment of this type is illustrated in FIG. 9. In this embodiment, a microcomputer incorporates a tactile pointing device (20). The keyboard (6), which is independent in relation to a computer keyboard (C), is integrated into a support (S) on which the computer keyboard (C) and the tactile pointing device (20) are installed.

Advantageously, the tactile pointing device (20) is used to implement the personal data keyboard (6) because a representation of the keyboard (6) is superposed on the tactile device (20). This representation may be constantly visible. In another embodiment, it may be visible only during the cardholder's identification operation by lighting implemented by an electroluminescent film, for instance.

Another embodiment according to the invention operates vocal synthesis means and a suitable dictionary. This dictionary may be downloaded and/or modified by a secured procedure using an authorized server. This server may be the conditional access device's model, for instance. The device can with vocal recognition means learn the minimum number of commands required to carry out transactions, such as accept, cancel, continue. For example, to check the price displayed on the computer screen, for instance $198.25, the procedure consists in transmitting the data relative to the price to the peripheral device, which transforms this information by synthesis and vocal reproduction means to emit the sounds "one", "nine", "eight", "point", "two", "five", "dollars".

Then the device validates the price for the transaction, for example the command "accept" pronounced orally by the holder of the inserted microcircuit card. The vocal commands may be recorded.

Figure 10:
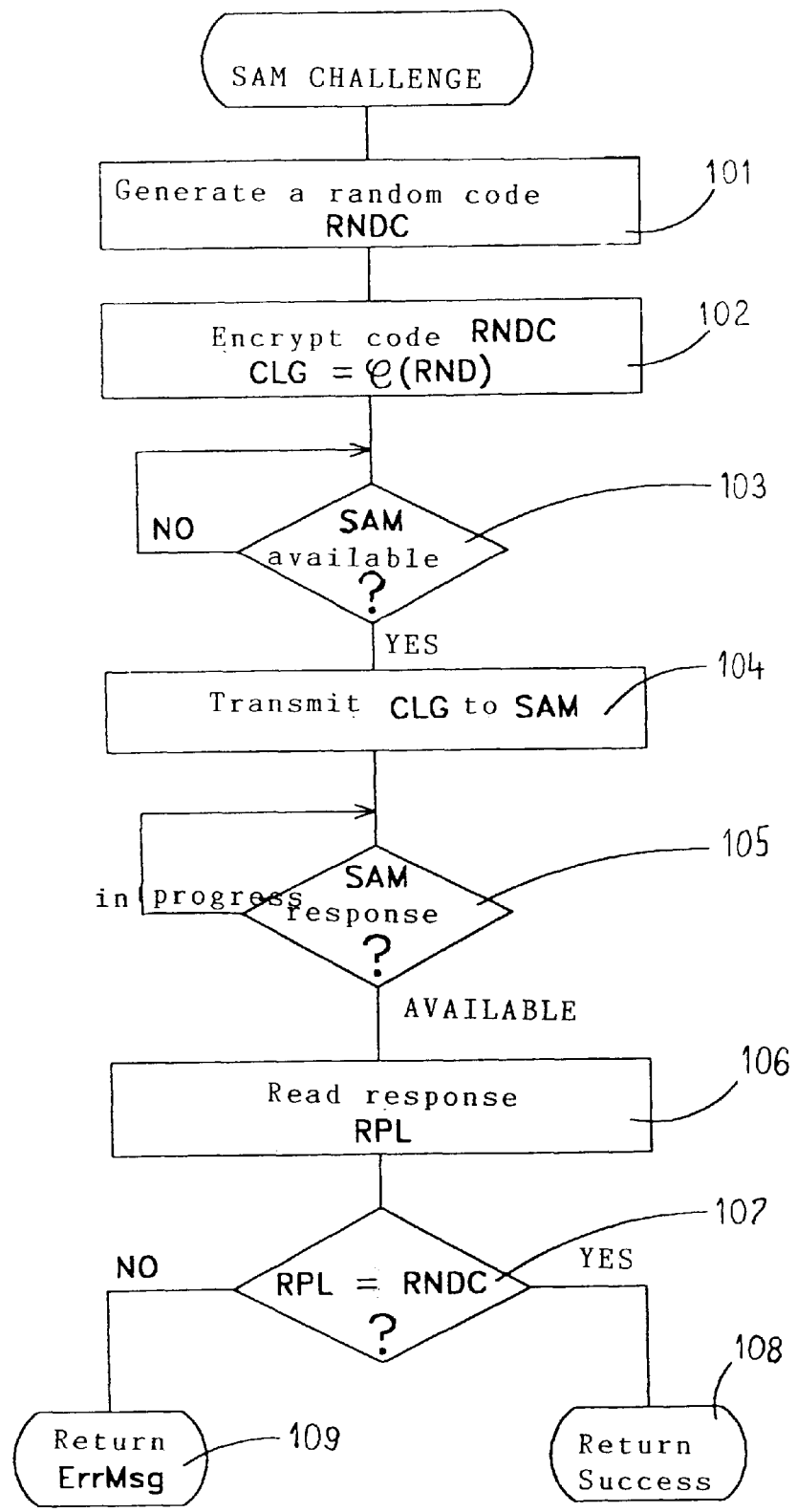
FIG. 10 is a flowchart illustrating a possible interrogation sequence by applicative software of a security application borne by a collector card inserted in the conditional access device according to a possible implementation mode of the invention.

We will now turn to FIG. 10 for other aspects of the invention.

The peripheral device comprises a security application, indicated by the initial 'SAM' in the following text. By the term 'security application' or SAM, we mean object software comprising an executable code and all the specific resources necessary for its working, residing and executing in the secured microcircuit which is also supplied with a secured operating system. A typical example of SAM is the electronic wallet available on the microcircuit card. A security application incorporated in the peripheral device is provided for at least one piece of applicative software in the host electronic equipment with which the peripheral device communicates.

Both the applicative software and its security application recognize the same secret information in the form of one or several of the keys; it sets into operation the same cryptographical algorithm, enabling the verification of this key.

A security distribution application is thus provided to replace the applicative software's ordinary key against fraud. This security application is conveniently but not restrictively carried by a chip card subsequently indicated by the term 'SAMC collector card'. This card is for example loaded from a second card named a distribution card or SAMD, which is for instance, supplied with applicative software needing protection against fraud. In this context, FIG. 10 is a flowchart of a basic inquiry sequence of a SAM security application residing in the peripheral device's collector card by applicative software executing locally or accessing to host equipment communicating with the peripheral device. SAM's role is a protection key for this applicative software. The first stage of the SAM test (stage 101) consists in generating a random code (RNDC) which is subsequently memorized. In a second stage (102), code (RNDC) is encrypted according to the balanced key procedure which is well known in the art. This encrypted code is recognized by the applicative software and its SAM. The result of stage (102) is another side representing a test (CLG) which is transmitted to SAM. In stage (103) the applicative software checks to determine if it can transmit the test (CLG) to the device's pilot. In stage (104) the test message (CLG) is transferred to the pilot which transmits it, according to an extended protocol in relation to the communication protocol specific to the pointing means of the peripheral device, to its destination SAM.

In stage (105) the applicative software waits for a predefined lapse of time for SAM's response. SAM uses an algorithm to decrypt the test (CLG).

If SAM is authentic, the decrypting key is the same and refinds a clear initial random code. Its response (RPL) is transmitted to the device's pilot for reading in stage (106) by the applicative software. A following stage (107) consists in comparing the initial code (RNDC) with the response (RPL). If they are identical, there is not a fraud. Such a SAM sequence test is incorporated in the protected applicative software. If the sequence has only one response message in the case of success stage (108), error messages (109) are more numerous in practice and reflect the possible failure situations in all their stages.

Figure 11:
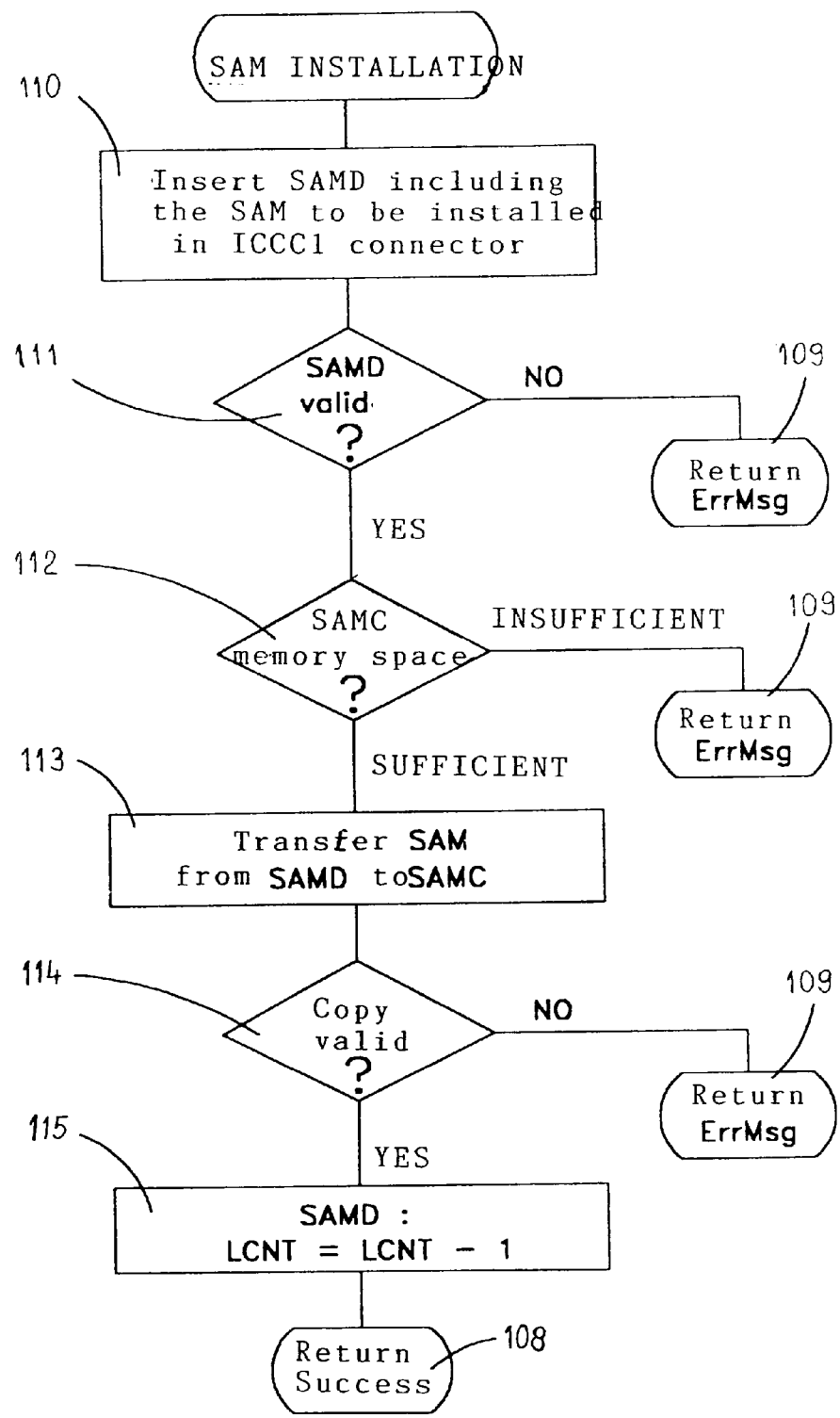
FIGS. 11 and 12 are flowcharts illustrating the installation and the uninstallation of a security application on a collector card inserted in the conditional access device according to a possible implementation mode of the invention.

The simplified sequence of a security application installation or SAM in the procedure according to the invention is presented in FIG. 11.

A SAMD security application distribution card can be used for several installations of the same security application. The card comprises, for each security application, a license counter (LCNT) initialized to the number of installations allowed by the application. The applicative's installation program requires in stage 110 a SAMD distribution card in the peripheral device's coupler. The procedure is interrupted:

If a test (stage 111) does not recognize the SAMD distribution card or the counter (LCNT) of the number of licenses to be installed is set at zero.

If a test (stage 112) does not read enough memory in the SAM collector card or if the card cannot take the SAM which is to be installed, or If a test (stage 114) does not validate the copy.

If the conditions of tests in stages (111) and (112) are met, stage 113 transfers SAM from the SAMD distribution card to the collector card SAMC.

The peripheral coupler's microcontroller triggers the transfer which subsequently is carried out between the two cards in a standard secured data transfer process.

During this transfer, the microcontroller acts only as a link channel between both the SAMC and SAMD cards. The SAMC collector card's operating system brings the SAM to its executable form. Then the SAMC card carries out the test in stage (114) which includes the so-called transfer validation and afterwards the correct working verification of the SAM. This verification consists in simulating the interrogation of the SAM and checking its behavior. The SAMC collector card erases an invalid SAM from its memory. The installation of a SAM is equivalent to a value transfer according to a transactional mechanism similar to the one used in the electronic wallet system. This transactional mechanism ensures that the stage (115) and the license counter LCNT are diminished by a sole unit if the SAM is validated by the secured means of SAMC storage management and execution.

Figure 12:
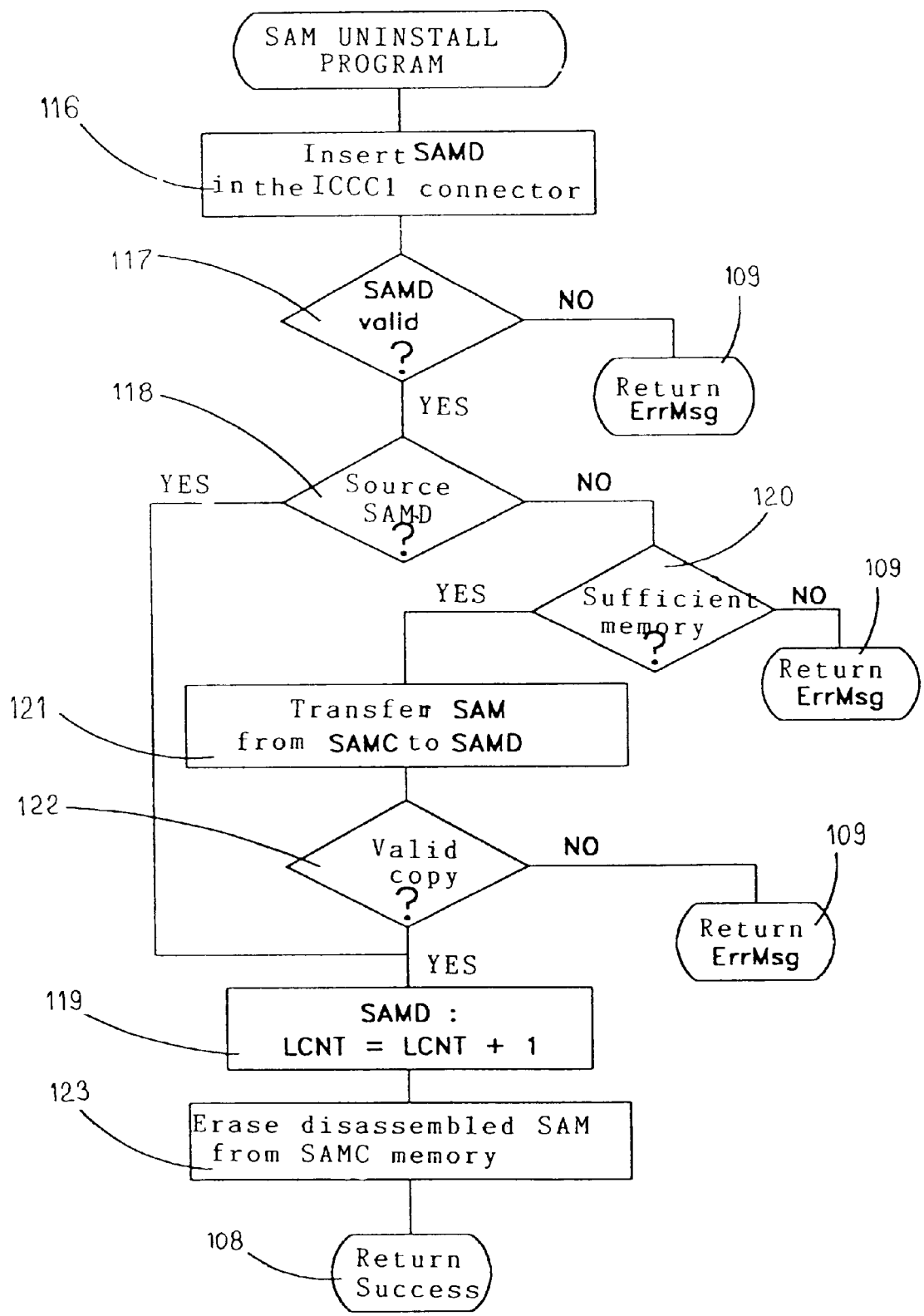

The simplified flowchart of the uninstallment of the SAM application in the process according to the invention is presented by FIG. 12.

In stage (116), the applicative's uninstallment program protected by the SAM requires the insertion of a SAMD distribution card or the equivalent, in the peripheral device's coupler.

Test (117) checks if the SAM about to be uninstalled will accept the inserted card in the coupler. If the SAMD card is the source card, the SAM code is still present and stage (119) increases the license counter (LCNT) by a unit.

If the SAMD card is not the source card, the SAM code is transferred to the SAMC collector card in stage (121) of the installation process described above. Still in stage (121) the SAMD card's operating system creates a license counter (LCNT) initialized to zero. In the case of a SAM code transfer in stage (122), the SAMD card checks the copy's validity, as in stage (114) of the SAM installation flowchart. By the same transactional mechanism as the one found in the SAM installation, the disassembly operation ensures that the SAMD card comprises a valid SAM and a license counter (LCNT) increased by a unit only in the "success" mode. It also ensures that the SAMC erases the SAM in question from its memory in stage (123). The process thus allows all SAMD cards having received a security application by an uninstallment process to be the equivalent to a source distribution card. A security application is transferred between two remote cards communicating with each other by interposed means ensuring the transport and integrity of their messages via communications networks. Thus, a SAM transfer procedure, seen as a floating software license of one piece of host equipment to another using communications networks, is similar to the SAM uninstallment process described above.

In this case, the distribution card is replaced by the destination collector card.

In preference, the communication protocol used for the security applications' management and execution employs the same serial communication channel to transport pointing information and security messages. Thus, the pointing and microcircuit card terminal functions are available quasi-simultaneously and independently of one another. In the framework of the communications protocol, the information and commands are transmitted in a frame form incorporating a whole made up of fields, each constituted by a coded sequence carrying a predetermined number of bits, as illustrated in FIG. 13. Therefore, a frame necessarily comprises an identification field (FID) and at least one of the following fields:

a pointing information field; and an information field relative to security operations.

The identification field (FID) initializes the reception means for the analysis of its contents. For peripheral pointing devices and a given functioning mode, their frames have a fixed length. In such a frame, the most significant bit is reserved for the identification at its start of the frame. The protocol set into operation uses the same method to remain compatible with traditional pointing devices and always places the pointing information at the start of the extended frame. Therefore, it is not restrictive to consider the pointing frame as a part of the extended frame's identification field (FID) as illustrated in FIG. 6. For example, the presence of the information field relative to a security application can be indicated according to the same principle by a particular value of a group of bits from the frame's first byte. Thus, the information field relative to a security operation comprises all or one part of the following fields in the quotation order, from a position determined by the particular value of an identification field's (FID) group of bits:

control field (OPC), field giving the security application's message length (DLEN), field comprising all or a part of the security application message proper (CLG) or (RPL), and control field of the message's integrity (CRC).

The extended frames have a variable length according to the control field (OPC). If the frame comprises a (CLG) message intended for a security application or a (RPL) message meant for an applicative software program, the (OPC) field is followed by a (DLEN) field giving the length of the (CLG) or (RPL) message. The length of the (DLEN) field is a function of the maximal length admitted for the (CLG) and (RPL) messages. The device's control and processing means ignore the (CLG) and (RPL) messages' significance. The optional field (CRC) enables a possible control of (CLG) and (RPL) messages' integrity.

An extended frame is completely defined by its control field (OPC) which comprises at least the following information (FIG. 14):

an (OPC.C) code of the operation concerning one or several security applications, the address of the security application concerned by an (OPC.A) frame, and the information field's number of bytes relative to a security application transmitted by an extended frame, this number (OPC.S) being at least equal to the field length (OPC).

The (OPC.A) address also takes into account the coupler with which we access the security application. Lone messages are transmitted by segments of a constant length (OPC.S) with the exception of the last segment which is divided into several shorter extended frames. This method ensures the uniformity of the pointing information's acquisition frequency.

FIGS. 15 and 18 illustrate a particular implementation of the extended frame's structure described above with the aid of FIGS. 13 and 14.

FIG. 15 presents the frame emitted by a conventional mouse. This frame comprises three bytes whose most significant bits are not used. These bits are used to indicate the extended frames.

From this frame, FIG. 16 illustrates the structure of an extended frame whose identification field (FID) retakes the pointing frame and positions the most significant bit of its first byte at 1. Thus, the device's pilot detects the extended frame and analyses the fourth byte which corresponds to the control field (OPC) of the security information. The fifth byte (DLEN=m) indicates the length in bytes of a SAM application response alone or in association with another binary field available in the precedent bytes, for example, the most significant bits of the two and three bytes. The control field (CRC) comprises (n) bytes.

FIGS. 17 and 18 illustrate the structure of the first and the fifth frame of the extended frames which transmit the security application's response in several consecutive segments for the OPC.S=8 parameter, a (RPL) 32 bytes response and a (CRC) of 16 bits. The (OPC.8) field indicates to the device's driver the information field's number of bytes relative to a security application added to the pointing frame, with the exception of the last frame. Therefore, the pointing frames and the extended frames can be alternated.

The invention is described in the preceeding text as a nonrestrictive example. It should be understood that a person in the profession could implement several embodiments within the framework of the invention.

I claim:

1. A conditional access device, intended to be used in liaison with host electronic equipment, made up of a peripheral pointing device incorporating at least one coupler for a microcircuit card characterized in that there are personal information acquisition means particular to each user, in that personal information is locally compared with information stored in the microcircuit card without this personal information being transmitted to the host electronic equipment, and in that the personal information acquisition means are constituted by a device for showing a display on a virtual screen of the host electronic equipment and also by a virtual keyboard having graphical representations with a layout that varies in a random way with each activation, so that personal information acquisition is carried out by graphical representation pointing with validation when a position of the peripheral pointing device is on the graphical representation and processing of pointing information with validation on the virtual screen is implemented exclusively in the conditional access device.

2. The conditional access device according to claim 1, characterized in that the personal information acquisition means particular to each user are constituted by the virtual keyboard to key-in an alphanumerical identification code on a tablet with a sensitive zone for capture of written personal information.

3. The conditional access device according to claim 1, characterized in that the personal information acquisition means are constituted by a sensor for capture of a biometrical identification signal.

4. The conditional access device according to claim 1, characterized in that the personal information acquisition means include the virtual keyboard to key-in personal information and the device for showing the display on the virtual screen to show the transaction.

5. The conditional access device according to claim 1, characterized in that the personal information acquisition means are constituted by an acquisition module and digitization of each user's voice.

6. The conditional access device according to claim 1, characterized in that there are vocal synthesis means and sound reproduction for control of a transaction.

7. The conditional access device according to claim 1, characterized in that the personal information acquisition means are constituted by a tactile pointing zone having a representation of the virtual keyboard superposed onto a tactile surface.

8. The conditional access device according to claim 1, characterized in that there are a permanently working clock and a means for transmitting information to peripheral equipment, said information being dated numerical data with a data sequence relative to an authorization calculated from stored data in the microcircuit card, said data big keyed in by each user and said sequence being given by the clock.

9. The conditional access device according to claim 1, characterized in that there are means for allowing execution in cooperation with the host electronic equipment on on-line networks, all or a part of the following secured transactions involving one of an electronic wallet card and a credit card:

a) payment, b) refunding, c) cancelling an operation, d) currency selection and/or all or a part of the following secured transactions involving an inserted electronic wallet card, e) loading the electronic wallet card from a bank account, f) transfer of a value from the electronic wallet card to the bank account, and g) transfer of a value from the electronic wallet card to another electronic wallet card and crediting the credit card.

10. The conditional access device according to claim 1, characterized in that there are means for allowing execution independently and/or in co-operation with the host electronic equipment, all or a part of the following operations involving an inserted electronic wallet card: a) a verification of a present value or a balance of an account, b) a reading of a list of recent transactions or a collector journal, c) locking an electronic wallet card, and d) a change of an identification code.

11. The conditional access device according to claim 1, characterized in that there are means for carrying out transactions between resident financial applications on the microcircuit card.

12. The conditional access device according to claim 1, characterized in that there are means including an electronic wallet application and means for allowing each user to carry out all or part of the following operations between two cards successively inserted into a connector; a) transfer of a value from an electronic wallet card to another electronic wallet card, b) transfer of a value from the electronic wallet card to the conditional access device itself, c) debit or credit a value on the electronic wallet card and credit or debit the same value on a credit card, and d) cancel an operation.

13. The conditional access device according to claim 1, characterized in that an electronic wallet application is incorporated in the microcircuit card.

14. The conditional access device according to claim 1, characterized in that there are an active digitization surface with a stylus, a tactile device, and a readout, said active digitization surface and said readout being superposed.

15. A securization process for access to host equipment by setting into operation a conditional access device, characterized in that certain functions at least of the host equipment are only accessible after capture, by a user, of personal information which conforms to information recorded on a microcircuit card and verification of conformity between the personal information and the information recorded on the microcircuit card is realized by a peripheral device linked to the host equipment, without the personal information being transmitted to the host equipment, and further characterized in that all information and commands are transmitted in a framework of a communication protocol in wave form constituting a whole, made up of fields each formed by a coded sequence having a predetermined number of bits, each frame incorporating an identification field (FID) and at least one of the following fields: a pointing information field; and a field of information relative to a secured device for storage, management and execution of a security application.

16. A process of secured data transactions comprising the steps of comparing a user's personal information and data contained in a microcircuit card, and setting in operation a conditional access device, characterized in that a control step is carried out by the conditional access device which forms a protective barrier against computer fraud, and further characterized in that all information and commands are transmitted in a framework of a communication protocol in wave form constituting a whole, made up of fields each formed by a coded sequence having a predetermined number of bits, each frame incorporating an identification field (FID) and at least one of the following fields: a pointing information field; and a field of information relative to a secured device for storage, management and execution of a security application.

17. Process for management and execution of security applications within host interactive electronic equipment equipped with peripheral equipment, said electronic equipment comprising a screen and means for allowing local and remote execution of applicative software and having a graphical user interface with visual objects which a user can act upon manually by activating the peripheral equipment, characterized in that said process includes a communication protocol between a part at least of the applicative software and a secured device for storage, management and execution of a security application, cooperating with at least one coupler for receiving a microcircuit card incorporating a distribution application of the security applications, said communication protocol being an extension of a communication protocol specific to a pointing means for the peripheral equipment, and in that all information and commands are transmitted in a framework of the communication protocol in waveform comprising a whole, made up of fields each constituted by a coded sequence having a predetermined number of bits, each frame incorporating an identification field (FID) and at least one of the following fields:

A pointing information field; and

A field of information relative to the secured device.

18. A process according to claim 17, characterized in that the field of information relative to the secured device comprises all or a part of the following fields in quotation order:

a control field (OPC), a field giving a length of a security application message (DLEN), a field which includes all or a part of the security application message proper (CLG) or (RPL), and a control field fix integrity of the security application message, (CRC).

19. A process according to claim 18, characterized in that the control field (OPC) includes at least the following information:

an operation code (OPC. C) concerning one or several security applications;

an address of the security application message concerned by frame (OPC. A); and a number (OPC. S) of bytes of the field relative to the security application message transmitted by an extended frame, said number (OPC. S) being at least equal to a length of the control field (OPC).

20. A process according to claim 19, characterized in that the distribution application of the security applications includes a license counter (LCNT) for control of multiple transfers of the same security application to a limit of a predefined number of licenses.

21. A process according to claim 20, characterized in that a transfer operation between local and remote secured devices includes all or a part of the following steps:

identification of an initiator of the transfer;

reciprocal authentification of secured means of participants;

secured copying of an application code on a destination means;

validation of the copying; and invalidation of a security application in a source means.

22. A process according to claim 21, characterized in that the identification step of the initiator consists in the security application having been installed in the secured device for storage, management and execution of a the security applications, or only the distribution application of the security applications identifying the initiator by a personal code captured exclusively using the peripheral equipment and without the personal code being transmitted through the interactive electronic equipment.

23. A process according to claim 22, characterized in that the invalidation step of the security application in the source means consists in erasing the personal code and maintaining the distribution application of the security applications of which only the license counter (LCNT) is decremented by a unit.

24. A process according to claim 23, characterized in that the peripheral equipment supplies pointing information to active applicative software and at the same time ensures transmission of messages towards the same or another simultaneously active applicative software.

25. A process according to claim 24, characterized in that the host interactive electronic equipment transmits to the conditional access device information relative a current transaction, in that this information is translated by vocal synthesis, and in that validation of the current transaction is implemented by oral pronunciation of a word or a predetermined phrase by the user of microcircuit card inserted in the peripheral equipment.

* * * * *